`US010609232B2`

United States Patent
Narita

(10) Patent No.: US 10,609,232 B2
(45) Date of Patent: Mar. 31, 2020

(54) JOB EXECUTION APPARATUS, METHOD OF CONTROLLING JOB EXECUTION APPARATUS, AND STORAGE MEDIUM JOB EXECUTION APPARATUS, METHOD OF CONTROLLING JOB EXECUTION APPARATUS, AND STORAGE MEDIUM FOR SETTING A SETTING VALUE

(71) Applicant: CANON KABUSHIKI KAISHA, Tokyo (JP)

(72) Inventor: Tateki Narita, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/163,281

(22) Filed: Oct. 17, 2018

(65) Prior Publication Data

US 2019/0124218 A1 Apr. 25, 2019

(30) Foreign Application Priority Data

Oct. 20, 2017 (JP) .................................. 2017-203959

(51) Int. Cl.
 *G06F 3/12* (2006.01)
 *H04N 1/00* (2006.01)
(52) U.S. Cl.
 CPC ..... *H04N 1/00482* (2013.01); *H04N 1/00389* (2013.01)

(58) Field of Classification Search
 None
 See application file for complete search history.

(56) References Cited

U.S. PATENT DOCUMENTS

| 2012/0050781 A1* | 3/2012 | Morita | H04N 1/00482 |
| | | | 358/1.13 |
| 2017/0070624 A1* | 3/2017 | Hanada | G03G 15/502 |
| 2018/0234564 A1* | 8/2018 | Hirasawa | H04N 1/00506 |

FOREIGN PATENT DOCUMENTS

JP  2004-280492 A  10/2004

* cited by examiner

*Primary Examiner* — Henok Shiferaw
(74) *Attorney, Agent, or Firm* — Canon U.S.A., Inc. IP Division

(57) ABSTRACT

A job execution apparatus according to embodiments of the present invention includes a display unit configured to display a setting screen, a job execution unit, a reset unit configured to set default values in all of a plurality of setting items upon receipt of a reset instruction, and a storage unit configured to store predetermined setting items out of the plurality of setting items and setting values in association with a shortcut key. The job execution apparatus is capable of displaying the setting screen in a state where the setting values stored in association with the shortcut key are set in the predetermined setting items, and the reset unit sets, upon receipt of the reset instruction after the selection of the shortcut key is received, the default values in setting items excluding a part thereof.

20 Claims, 12 Drawing Sheets

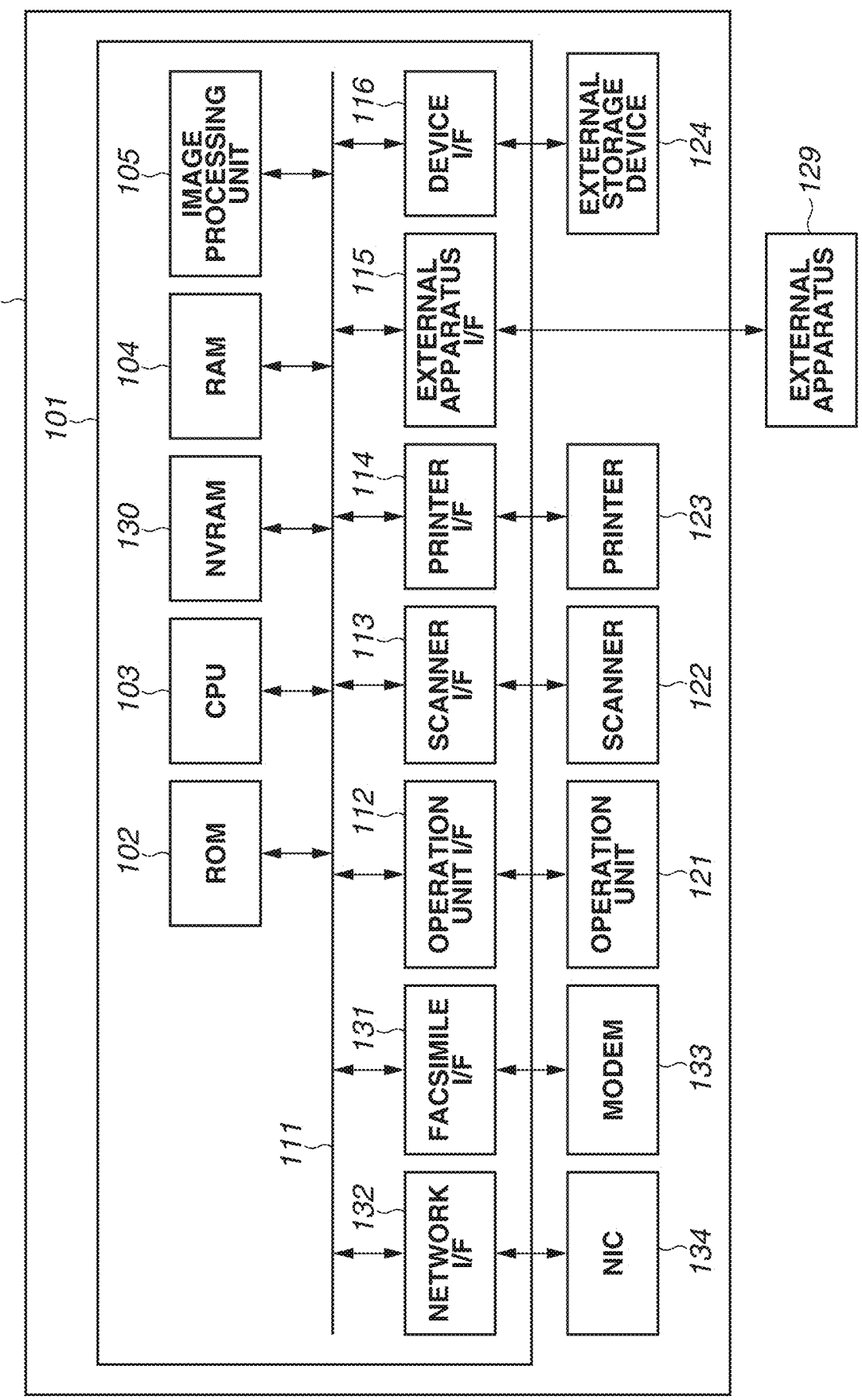

FIG.2A

| ∗∗∗ HOME | | COUNTER CHECK | ? | LOGOUT |
|---|---|---|---|---|
| | 202  203  204  205 | | | |
| < | ∗∗∗ COPY | ∗∗∗ FAX | ∗∗∗ SCAN | ∗∗∗ MEDIA PRINT | > |
| | ∗∗∗ SECURE PRINT | ∗∗∗ MENU | ∗∗∗ ADDRESS BOOK | ∗∗∗ PASSPORT COPY | |
| | 206  207  ① 2  208  201 | | | |
| <STATUS LINE> | | | | STATUS CHECK |

| ∗∗∗ COPY | | | ? | LOGOUT | 230 |
|---|---|---|---|---|---|
| MAGNIFICATION | SHEET | DENSITY | | NUMBER OF COPIES | 239 |
| 100% | A4 | ±0 | | 1 | |
| | DOUBLE-SIDED: OFF | | //RESET | 231 |
| PREVIEW | OFF / SINGLE-SIDED TO DOUBLE-SIDED / DOUBLE-SIDED TO DOUBLE-SIDED / DOUBLE-SIDED TO SINGLE-SIDED | | | 522 |
| | PAGE AGGREGATION: OFF | | MONOCHROME START | 234 |
| | OFF  2_1  4_1 | | | |
| | | OTHER SETTINGS | COLOR START | 235 |
| <STATUS LINE> | | | STATUS CHECK | |

| *** COPY | | | ? | LOGOUT |
|---|---|---|---|---|
| MAGNIFICATION 50% | SHEET A4 | DENSITY +4 | | NUMBER OF COPIES 1 |
| PREVIEW | DOUBLE-SIDED: SINGLE-SIDED TO DOUBLE-SIDED<br>[OFF] [SINGLE-SIDED TO DOUBLE-SIDED] [DOUBLE-SIDED TO DOUBLE-SIDED] [DOUBLE-SIDED TO SINGLE-SIDED]<br>PAGE AGGREGATION: 2 in 1<br>[OFF] [2_1] [4_1] | | READING SIZE A4<br>OTHER SETTINGS | //RESET<br>MONOCHROME START<br>COLOR START |
| <STATUS LINE> | | | | STATUS CHECK |

| *** COPY | | | ? | LOGOUT |
|---|---|---|---|---|
| MAGNIFICATION 100% | SHEET A4 | DENSITY ±0 | | NUMBER OF COPIES 1 |
| PREVIEW | DOUBLE-SIDED: OFF<br>[OFF] [SINGLE-SIDED TO DOUBLE-SIDED] [DOUBLE-SIDED TO DOUBLE-SIDED] [DOUBLE-SIDED TO SINGLE-SIDED]<br>PAGE AGGREGATION: OFF<br>[OFF] [2_1] [4_1] | | OTHER SETTINGS | //RESET<br>MONOCHROME START<br>COLOR START |
| <STATUS LINE> | | | | STATUS CHECK |

| ← | PASSPORT COPY | LOGOUT |
|---|---|---|
| 2 in 1 (DOUBLE-SIDED) | | ~210 |
| 4 in 1 (DOUBLE-SIDED) | | ~211 |
| 2 in 1 | | |
| 4 in 1 | | |

FIG.3B

| ← | OUTPUT SIZE | LOGOUT |
|---|---|---|
| ⇱ | DESIGNATED WHEN SHEET IS SET | ~220 |
| 1 | A4/PLAIN PAPER | ~221 |
| 2 | LTR/PLAIN PAPER | |
| 3 | A5/PLAIN PAPER | |
| 4 | B5/PLAIN PAPER | |

FIG.3C

| *** COPY | | | ? | LOGOUT | ~230 |
|---|---|---|---|---|---|
| MAGNIFICATION | SHEET | DENSITY | | NUMBER OF COPIES | |
| 114% | A4 | ±0 | | 1 | |

DOUBLE-SIDED: SINGLE-SIDED TO DOUBLE-SIDED  //RESET — 231

| OFF | SINGLE-SIDED TO DOUBLE-SIDED | DOUBLE-SIDED TO DOUBLE-SIDED | DOUBLE-SIDED TO SINGLE-SIDED |

PREVIEW

PAGE AGGREGATION: 2 in 1   MONOCHROME
                           READING SIZE   START — 233
| OFF | 2_1 | 4_1 | PASSPORT

OTHER SETTINGS    COLOR START

<STATUS LINE>    STATUS CHECK 237, 236, 232

FIG.4A

| ✱✱✱ COPY | | | ? | LOGOUT |
|---|---|---|---|---|
| MAGNIFICATION 50% | SHEET A4 | DENSITY +4 | | NUMBER OF COPIES 1 |
| PREVIEW | DOUBLE-SIDED: DOUBLE-SIDED TO DOUBLE-SIDED<br>[OFF] [SINGLE-SIDED TO DOUBLE-SIDED] [DOUBLE-SIDED TO DOUBLE-SIDED] [DOUBLE-SIDED TO SINGLE-SIDED]<br>PAGE AGGREGATION: 4 in 1<br>[OFF] [2_1] [4_1] | | READING SIZE A4 | //RESET<br><br>MONOCHROME START<br>COLOR START |
| | | OTHER SETTINGS | | |
| <STATUS LINE> | | | | STATUS CHECK |

| ✱✱✱ COPY | | | ? | LOGOUT |
|---|---|---|---|---|
| MAGNIFICATION 114% | SHEET A4 | DENSITY ±0 | | NUMBER OF COPIES 1 |
| PREVIEW | DOUBLE-SIDED: DOUBLE-SIDED TO DOUBLE-SIDED<br>[OFF] [SINGLE-SIDED TO DOUBLE-SIDED] [DOUBLE-SIDED TO DOUBLE-SIDED] [DOUBLE-SIDED TO SINGLE-SIDED]<br>PAGE AGGREGATION: 4 in 1<br>[OFF] [2_1] [4_1] | | READING SIZE PASSPORT | //RESET<br><br>MONOCHROME START<br>COLOR START |
| | | OTHER SETTINGS | | |
| <STATUS LINE> | | | | STATUS CHECK |

| SETTING ITEM | NAME | |
| --- | --- | --- |
| | PASSPORT COPY | COPY |
| READING SIZE | × | ○ |
| PAGE AGGREGATION | × | ○ |
| DOUBLE-SIDED | × | ○ |
| SHEET SIZE | × | ○ |
| MAGNIFICATION | × | ○ |
| DENSITY | ○ | ○ |
| NUMBER OF COPIES | ○ | ○ |
| OTHERS | ○ | ○ |
| . . . | . . . | . . . |

| NAME | SETTING VALUE |
| --- | --- |
| COPY | MAGNIFICATION = 100%, SHEET = A4 PLAIN PAPER, DENSITY = ±0, NUMBER OF COPIES = 1, DOUBLE-SIDED SETTING = OFF, PAGE AGGREGATION SETTING = OFF ... |
| PASSPORT COPY | READING SIZE = PASSPORT |
| . . . | . . . |

450  451

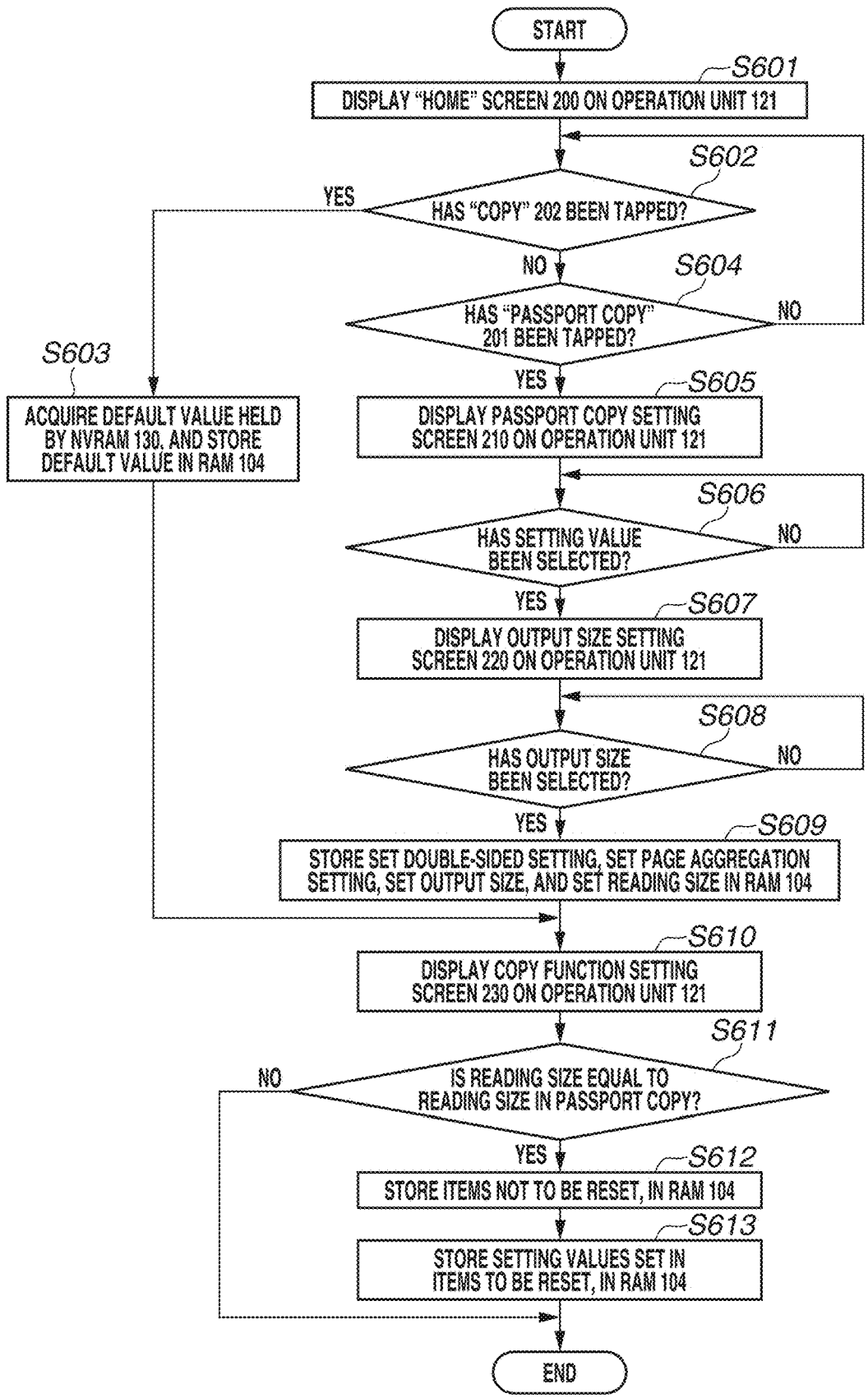

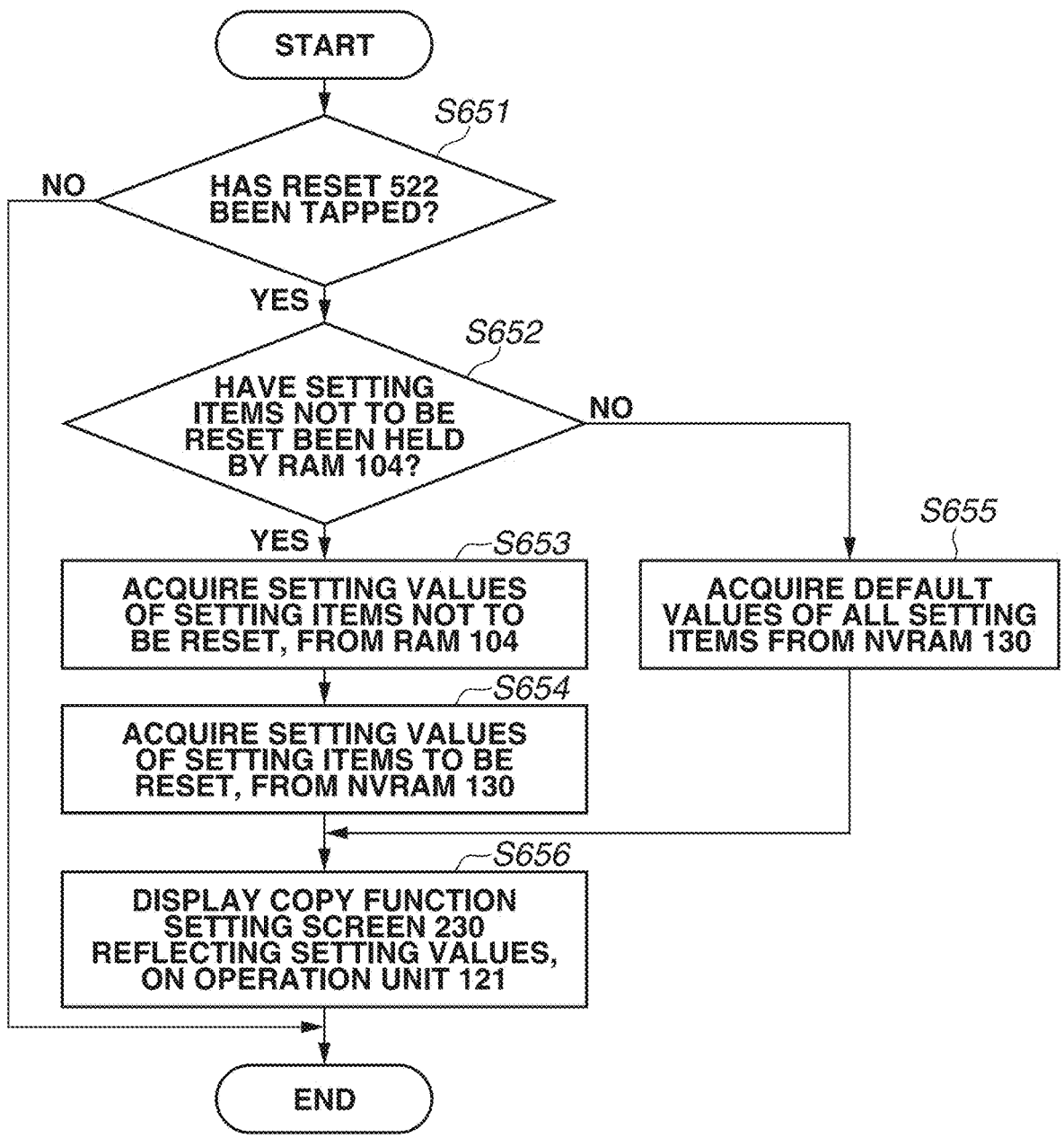

FIG.8A

| *** COPY | | | ? | LOGOUT | ~230 |

| MAGNIFICATION | SHEET | DENSITY | NUMBER OF COPIES |
|---|---|---|---|
| 114% | A4 | ±0 | 1 |

DOUBLE-SIDED: SINGLE-SIDED TO DOUBLE-SIDED

| OFF | SINGLE-SIDED TO DOUBLE-SIDED | DOUBLE-SIDED TO DOUBLE-SIDED | DOUBLE-SIDED TO SINGLE-SIDED |

//RESET

231 — PREVIEW

PAGE AGGREGATION: 2 in 1

| OFF | 2_1 | 4_1 |

READING SIZE PASSPORT — 233

MONOCHROME START

OTHER SETTINGS

COLOR START

<STATUS LINE>

STATUS CHECK

| *** COPY | | | ? | LOGOUT |

| MAGNIFICATION | SHEET | DENSITY | NUMBER OF COPIES |
|---|---|---|---|
| 114% | A4 | ±0 | 1 |

RESET SETTING VALUES OF ALL SETTING ITEMS? — 1001

YES  NO

<STATUS LINE>

STATUS CHECK 1002   1003

FIG.8C

| *** COPY | | | ? | LOGOUT |
|---|---|---|---|---|
| MAGNIFICATION<br>100% | SHEET<br>A4 | DENSITY<br>±0 | | NUMBER<br>OF COPIES<br>1 |
| PREVIEW | DOUBLE-SIDED: OFF<br>OFF / SINGLE-SIDED TO DOUBLE-SIDED / DOUBLE-SIDED TO DOUBLE-SIDED / DOUBLE-SIDED TO SINGLE-SIDED | | | //RESET — 231 |
| | PAGE AGGREGATION: OFF<br>OFF  2_1  4_1 | | | MONOCHROME<br>START |
| | | | OTHER<br>SETTINGS | COLOR<br>START |
| <STATUS LINE> | | | | STATUS<br>CHECK |

232

JOB EXECUTION APPARATUS, METHOD OF CONTROLLING JOB EXECUTION APPARATUS, AND STORAGE MEDIUM JOB EXECUTION APPARATUS, METHOD OF CONTROLLING JOB EXECUTION APPARATUS, AND STORAGE MEDIUM FOR SETTING A SETTING VALUE

BACKGROUND OF THE INVENTION

Field of the Invention

The present invention relates to a job execution apparatus, a method of controlling the job execution apparatus, and a storage medium.

Description of the Related Art

In a job execution apparatus having various functions such as a copy function and a scan function, a user performs read setting and print setting of a document to copy or scan the document. The job execution apparatus performs a scan job and a copy job according to the set reading setting and the set print setting.

In the above-described job execution apparatus, when the user selects a function to be used, a setting screen on which predetermined default values are set in respective setting items is displayed on an operation unit. The user sets desired setting values to the respective setting items through the setting screen, and then operates a start key. The job execution apparatus starts execution of the job in response to operation of the start key. In a case where the user sets wrong setting values when setting the setting values or in a case where the user wants to set setting values different from the previously set setting values, all of the values of the setting items are reset to the default setting values by the user having given a rest instruction to set the setting values of the respective setting items back to the default values.

There is a job execution apparatus that displays, on an operation unit, a shortcut key to call a setting often used in a certain situation. In such a job execution apparatus, when the user selects the shortcut key, a setting screen on which setting values associated with the shortcut key have been set is displayed on the operation unit (Japanese Patent Application Laid-Open No. 2004-280492). For example, there is a shortcut key to set a reading size of a document to a double-page spread size of a passport in order to copy the passport.

When the user sets the setting values using the shortcut key, there are setting items to which the user additionally sets setting values very often. For example, in the case of the shortcut key to copy the passport, page aggregation setting and double-sided setting may be added to copy a plurality of double-page spreads of the passport in one sheet.

After the user sets the setting values using the shortcut key, the user sets the setting values in the above-described setting items, and further sets setting values in other setting items. In a case where the user gives the reset instruction while the setting values are set in the other setting items, the setting items set using the shortcut key and the setting items frequently set when the shortcut key is used are also set to the default values. Accordingly, it is necessary for the user to set again the setting values in the setting items set using the shortcut key and the setting items set when the shortcut key is used, after giving the reset instruction.

SUMMARY OF THE INVENTION

Embodiments of the present invention are directed to reduction of labor to set the setting values of a part of the setting items again when the default values are set in the setting items in response to the reset instruction after the setting values are set by the shortcut key.

According to embodiments of the present invention, a job execution apparatus includes a display unit configured to display a setting screen for setting setting values in a plurality of setting items relating to a job, a job execution unit configured to execute the job with use of the setting values set through the setting screen, a reset unit configured to set, upon receipt of a reset instruction from a user, default values in all of the plurality of setting items on the setting screen, and a storage unit configured to store predetermined setting items out of the plurality of setting items and setting values set in the predetermined setting items, in association with a shortcut key. The job execution apparatus is capable of displaying, upon receipt of selection of the shortcut key, the setting screen in a state where the setting values stored in association with the shortcut key are set in the predetermined setting items. Upon receipt of the reset instruction while the setting screen is being displayed in response to the selection of the shortcut key, the reset unit sets the default values in the plurality of setting items excluding a part thereof.

Further features of the present invention will become apparent from the following description of exemplary embodiments with reference to the attached drawings.

BRIEF DESCRIPTION OF THE DRAWINGS

FIG. 1 is a diagram illustrating a configuration of an image forming apparatus according to an exemplary embodiment.

FIGS. 2A to 2D are diagrams illustrating an example of screen transition during execution of a copy job in the image forming apparatus according to an exemplary embodiment.

FIGS. 3A to 3C are diagrams illustrating an example of screen transition during execution of passport copy in the image forming apparatus according to an exemplary embodiment.

FIGS. 4A and 4B are diagrams illustrating an example of screen transition when a reset instruction is received from a user during execution of the passport copy in the image forming apparatus according to an exemplary embodiment.

FIGS. 5A and 5B are diagrams each illustrating an example of a reset target item table that manages items to be reset, in the image forming apparatus according to an exemplary embodiment.

FIG. 6 is a flowchart illustrating processing until a copy function setting screen is displayed in the image forming apparatus according to an exemplary embodiment.

FIG. 7 is a flowchart illustrating an example of processing that is executed when the reset instruction from the user is received in the image forming apparatus according to a first exemplary embodiment.

FIGS. 8A to 8C are diagrams illustrating an example of transition between screens displayed on an operation unit when a reset instruction from a user is received, according to a second exemplary embodiment.

DESCRIPTION OF THE EMBODIMENTS

Figure 9:
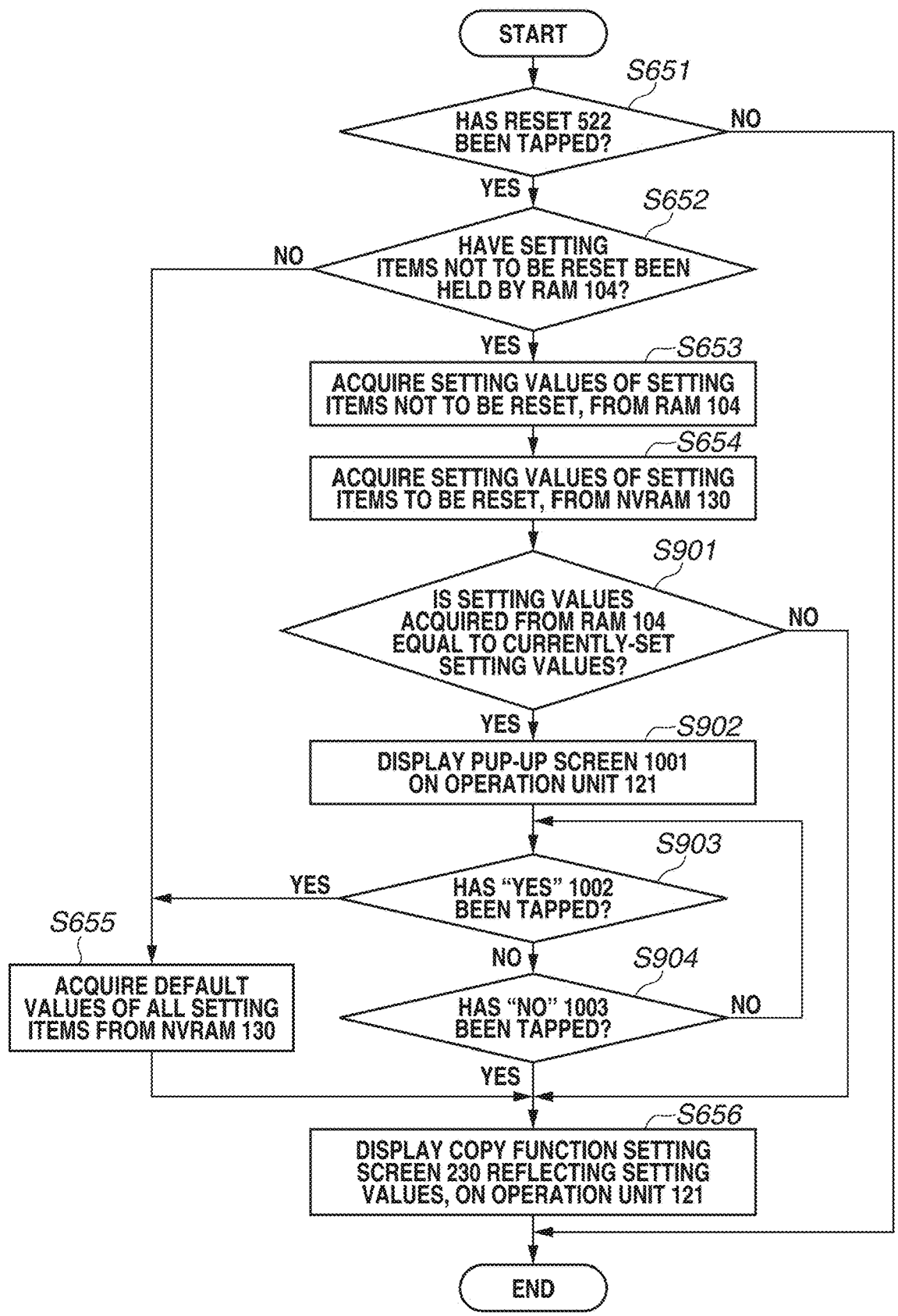
FIG. 9 is a flowchart illustrating processing that is executed by the image forming apparatus when the reset instruction from the user is received, according to the second exemplary embodiment.

Exemplary embodiments of the present invention are described below with reference to drawings. A first exemplary embodiment is first described. In the present exemplary embodiment, an image forming apparatus is described as an example of a job execution apparatus. Further, in the present exemplary embodiment, a shortcut key for passport copy in which a plurality of double-page spreads of a passport is read and is aggregately printed on one sheet is described as an example. In the present exemplary embodiment, the shortcut key indicates a key to set a setting value different from a default value, in at least one of a plurality of setting items to which the user can set setting values.

FIG. 1 is a diagram illustrating a system configuration of an image forming apparatus 100 according to the present exemplary embodiment.

The image forming apparatus 100 is an electrophotographic color or monochrome image forming apparatus using a toner, such as a digital electrophotographic copier, a laser printer, and a facsimile. The image forming method of the image forming apparatus 100 according to the present exemplary embodiment is not limited to the electrophotographic method. For example, the image forming apparatus 100 may form an image by an inkjet method.

The image forming apparatus 100 includes a controller 101, an operation unit 121, a scanner 122, a printer 123, an external storage device 124, a modem 133, and a network interface card (NIC) 134. The controller 101 includes a read-only memory (ROM) 102, a central processing unit (CPU) 103, a random access memory (RAM) 104, an image processing unit 105, and a nonvolatile RAM (NVRAM) 130. The CPU 103 is a processor that performs control of the whole of the apparatus, calculation processing, etc., and executes processing described below based on programs stored in the ROM 102. The ROM 102 stores a system boot program, a program controlling a printer engine, character data, character code information, etc. The RAM 104 is a data storage region not restricted in use. The RAM 104 is used as an execution region for programs and data in various processing. Further, the RAM 104 is used as a data storage region for a received image file. The image processing unit 105 performs image processing on image data that is obtained by reading an image of a document by the scanner 122. The NVRAM 130 holds default values of setting items relating to each of functions such as a copy function and a scan function, and setting values associated with shortcut keys held by the image forming apparatus 100. In the present exemplary embodiment, the default values and the setting values associated with the shortcut keys are managed with use of the NVRAM 130. Alternatively, the above-described information may be managed with use of a flash ROM.

The operation unit 121 includes, for example, a touch panel-type liquid crystal display. The operation unit 121 displays a setting state and an operation state of the apparatus, and image data. Further, a user instruction, such as an instruction to change a print setting and a read setting, and a reset instruction to set default values in the respective setting items, is received through the operation unit 121. As described above, the operation unit 121 serves to receive user operations. The scanner 122 is a read unit that reads an image formed on a document as a paper medium by an optical sensor. The printer 123 is a print unit that controls various devices (e.g., fixing device) of the printer engine. The external storage device 124 is a storage medium (e.g., universal serial bus (USB) memory) that is connectable to the image forming apparatus 100. The external storage device 124 stores image data that is used for printing by the image forming apparatus 100, and also stores image data that is generated by reading the image on the document by the scanner 122. In the present exemplary embodiment, the CPU 103 controls the scanner 122 and the printer 123 to control execution of jobs such as a copy job and a scan job.

The controller 101 further includes various kinds of interfaces (I/Fs) and a system bus 111. An operation unit I/F 112 connects the operation unit 121 and the image forming apparatus 100. A scanner I/F 113 controls supply of data from the scanner 122 to the controller 101. A printer I/F 114 controls supply of data from the controller 101 to the printer 123. An external apparatus I/F 115 connects the apparatus to an external apparatus 129 through a network (e.g., local area network (LAN)) or a facsimile (FAX) line. The image forming apparatus 100 acquires image data from the external apparatus 129, and prints an image generated from the image data. A device I/F 116 connects the external storage device 124 and the image forming apparatus 100. A facsimile I/F 131 connects the image forming apparatus 100 to a public line (a public switched telephone network (PSTN)) through the modem 133. The image forming apparatus 100 can transmit and receive facsimile information to and from other facsimile apparatus through the PSTN. A network I/F 132 controls the NIC 134 including a wired LAN or a wireless LAN. The network I/F 132 receives the print job or transmits image data acquired by the scanner I/F 113 through the network. The system bus 111 is a data path among the above-described components.

In the present exemplary embodiment, the CPU 103 in the controller 101 executes processing described below. Alternatively, a computer including the controller 101 may execute the processing described below.

FIGS. 2A to 2D are diagrams illustrating examples of a home screen 200 displayed on the operation unit 121 after the user starts up the image forming apparatus 100, and a screen displayed on the operation unit 121 when the copy function is used.

FIG. 2A illustrates the home screen 200 on which software keys allowing the user to use various kinds of functions are displayed. The home screen 200 is a function selection screen for the user to select a function to be used. "Copy" 202 is a software key for the user to use the copy function to generate an image from image data that is obtained by reading an image of a document by the scanner 122 and to print the generated image on a sheet. "Fax" 203 is a software key for the user to use a FAX function to transmit the image data that is obtained by reading the image of the document by the scanner 122, to other information processing apparatus through the FAX line. "Scan" 204 is a software key for the user to use a scan function to read the image of the document and to generate the image data based on the read image by controlling the scanner 122. "Media print" 205 is a software key for the user to use a direct print function to read a file from the external storage device 124 and to print the file by the printer 123. "Secure print" 206 is a software key for the user to use a secure print function to receive print data in a page description language (PDL) format and to print the print data by the printer 123. The secure print function is a function to temporarily store, in the RAM 104, the image data generated from the print data by the image processing unit 105 and to print the image data upon receipt of a print instruction from the user. "Menu" 207 is a software key for the user to perform various kinds of settings in the image forming apparatus 100. "Address book" 208 is a software key for the user to use a function to store a transmission destination that is set as a transmission destination of the image data generated by scanning in the scan function.

When the user taps "copy" 202 on the home screen 200, a copy function setting screen 230 illustrated in FIG. 2B is displayed on the operation unit 121. The copy function setting screen 230 is a screen for the user to set setting values in a plurality of setting items that are used when the user executes the copy job. The copy function setting screen 230 that is displayed on the operation unit 121 in response to tap operation on "copy" 202 is a setting screen on which default values stored in the NVRAM 130 have been set.

"Magnification" 237 is a setting item set to enlarge or reduce the image obtained by reading the image of the document when printing the image on a sheet. In FIG. 2B, "magnification" 237 is set to the default value of 100%. "Sheet" 236 is a setting item indicating a size and a type of a sheet on which the image is to be printed. The sheet size displayed here is a sheet size that is stored in association with a sheet feeding tray set as the default value. "Density" 238 is a setting item indicating color density when the image is formed on a sheet. In "density" 238, a larger value indicates darker color, and a smaller value indicates lighter color. "Number of copies" 239 is a setting item indicating the number of copies to be printed when the copy function is used, "Double-sided setting" 231 is a setting item to set whether the document is a single-sided document or a double-sided document, and whether to perform single-sided printing or double-sided printing, "OFF" is a setting value to read one side of the document by the scanner and to print the read document on one side of a sheet. "Single-sided to double-sided" is a setting value to read one side of the document by the scanner and to print the read document on both sides of the sheet. "Double-sided to double-sided" is a setting value to read both sides of the document and to print the read document on both sides of the sheet. "Double-sided to single-sided" is a setting value to read both sides of the document and to print the read document on one side of the sheet. "Page aggregation" 232 is a setting value to print images of a plurality of pages of the document on one sheet. A setting value "2_1" indicates 2-in-1 printing in which images of two pages of the document are printed on one side of one sheet. A setting value "4_1" indicates 4-in-1 printing in which images of four pages of the document are printed on one side of one sheet. "Other settings" is used to perform detailed settings of the copy function that are not settable on the copy function setting screen 230.

"Monochrome start" 234 and "color start" 235 are software keys to instruct to start execution of the copy job to read a document and to print a monochrome image or a color image based on the read document. The CPU 103 detects a tap operation on "monochrome start" 234 or "color start" 235 and controls the scanner 122 and the printer 123, thereby executing the copy job. "Reset" 522 is a software key to set the setting values settable by the user on the copy function setting screen 230 to default values stored in the NVRAM 130.

FIG. 2C illustrates a screen displayed when the user has set "density" 238, "double-sided setting" 231, and "page aggregation setting" 232 after the copy function setting screen 230 is displayed on the operation unit 121. In a case where page aggregation is set, the user sets a size of the document to be read by an unillustrated method. "Reading size" 233 is a setting value that is set by the user when the page aggregation is set, and indicates a size of a region to be read by the scanner 122 when reading the document. In a case where the page aggregation is not set, the reading size of the document is the same as the size displayed in "sheet" 236. The magnification displayed in "magnification" 237 in FIG. 2C is a size determined from the sheet size and the reading size that are respectively set in "sheet" 236 and "reading size" 233. In this example, images of two pages of an A4-size document are printed on one A4 size sheet, and "magnification" 234 is accordingly set to 50%.

FIG. 2D illustrates a screen displayed on the operation unit 121 after the user taps "reset" 522 on the screen of FIG. 2C. In a case where the user sets setting values of the copy job after the user performs a tap operation on "copy" 202, the default values stored in the NVRAM 130 are set in all of the setting items in response to a tap operation on "reset" 522. Accordingly, in FIG. 2D, "density" 238 is set to "±0", "double-sided setting" 231 is set to "OFF", and "page aggregation setting" 232 is set to "OFF". Further, "reading size" 233 is hidden because "page aggregation setting" 232 is set to "OFF". In other words, "reading size" 233 is set to A4 size that is same as "sheet" 236.

FIGS. 3A to 3C are diagrams each illustrating a screen displayed on the operation unit 121 in a case where the user uses the shortcut key function of "passport copy" 201 in the image forming apparatus 100 according to the present exemplary embodiment. In the present exemplary embodiment, when the user performs a tap operation on the shortcut key, the copy function setting screen 230 is displayed in a state where a setting value different from the default value is set in at least one of the setting items to which the user can set the setting values.

When the user performs a tap operation on "passport copy" 201, a passport copy setting screen 210 illustrated in FIG. 3A is displayed on the operation unit 121. The passport copy setting screen 210 is a screen to set a combination of the page aggregation setting and the double-sided setting. The passport copy setting screen 210 presents representative combinations of the page aggregation setting and the double-sided setting. The representative combinations of the page aggregation setting and the double-sided setting include "2 in 1" in which images of two pages are aggregated in one sheet, "4 in 1" in which images of four pages are aggregated in one sheet, and "2 in 1 (double-sided)" and "4 in 1 (double-sided)" in which the sheets on which the images have been aggregated are printed on both sides of a sheet. "Passport copy" 201 is a function used when the user aggregates and prints a plurality of double-page spreads of a passport. Accordingly, the passport copy setting screen 210 does not accept, from the user, the setting to set the page aggregation setting to "OFF".

The user selects a combination of the setting values to be used for the passport copy from the representative combinations displayed on the setting screen 210. This makes it possible to set the page aggregation setting and the double-sided setting at a time. For example, in a case where the user selects "2 in 1 (double-sided)", the images generated by reading the document by the scanner 122 and corresponding to two pages are printed on each of both sides of the sheet.

When the user performs a tap operation on the combination of the page aggregation setting and the double-sided setting, an output size setting screen 220 illustrated in FIG. 3B is displayed on the operation unit 121. The output size setting screen 220 is a screen for setting the size of a sheet on which the image is to be printed. For example, in a case where the user selects "1: A4/plain paper", the image is printed on an A4 size plain paper placed on a cassette 1.

When the user selects an A4 size 221 of the cassette 1, the copy function setting screen 230 illustrated in FIG. 3C is displayed on the operation unit 121. The copy function setting screen 230 illustrated in FIG. 3C is a screen similar to the copy function setting screen 230 illustrated in FIG. 2D. In the copy function setting screen 230 illustrated in FIG. 3C, however, the setting values set on the setting screen 210 are set in "double-sided setting" 231 and "page aggregation setting" 232. More specifically, "double-sided setting" 231 is set to "single-sided to double-sided", and "page aggregation setting" 232 is set to "2_1".

"Reading size" 233 is a setting item indicating a reading size in which the scanner 122 reads the document. In the case where the shortcut key for the passport copy is used, "reading size" 233 is set to "passport" size. "Passport" size indicates a size of a double-page spread of the passport and is 130 mm×180 mm. As described above, "passport" size is a size different from a normal regular sheet size.

In "sheet" 236, a sheet to be used when the scanned image is printed is displayed. The sheet displayed in "sheet" 236 corresponds to the sheet size set on the output size setting screen 220. A setting value set in "magnification" 237 is determined from the reading size, the sheet size, and the page aggregation setting. In the present exemplary embodiment, the reading size is set to the passport size, the sheet is set to an A4 size, and the page aggregation setting is set to 2 in 1. Accordingly, in "magnification" 237, a magnification employed when passport size images of two pages are printed on an A4 size sheet without changing an aspect ratio of each of the images. The user may change the magnification to an optional value by performing a tap operation on "magnification" 237.

Next, operation of the image forming apparatus 100 when the user performs a tap operation on "reset" 522 is described with reference to FIGS. 4A and 4B.

FIG. 4A illustrates the copy function setting screen 230 when the user sets "density" 238, "double-sided setting" 231, and "page aggregation setting" 232 after the screen illustrated in FIG. 3C is displayed on the operation unit 121. "Density" 238 is changed from "±0" to "+4". "Double-sided setting" 231 is changed from "single-sided to double-sided" to "double-sided to double-sided", "Page aggregation setting" 232 is changed from "2_1" to "4_1". Further, when "page aggregation setting" 232 is changed, "reading size" 233 is changed to "A4". Furthermore, since "reading size" 233 is changed, "magnification" 237 is changed to "50%".

FIG. 4B illustrates a screen displayed on the operation unit 121 when the user performs a tap operation on "reset" 522 on the screen illustrated in FIG. 4A, "Density" 238 is set to the default value in response to the tap operation on "reset" 522. Meanwhile, as for "magnification" 237, "sheet" 236, "double-sided setting" 231, and "page aggregation setting" 232, the setting values same as the setting values in FIG. 3C are set. As described above, when the user performs a tap operation on "reset" 522 in the processing of "passport copy" 201, the screen on which the reading size has been set to the passport size, and the setting values set on the passport copy setting screen 210 and the output size setting screen 220 have been reflected is displayed.

As described above, in the present exemplary embodiment, in the case where the user sets the setting values of the copy job with use of the shortcut key in which the settings are set to setting values different from the default values, the setting items are set to the default values in response to the reset instruction for resetting the setting values from the user, except a part of the setting items. The part of the setting items includes the setting items set after the user selects the shortcut key until the copy function setting screen 230 is displayed, in addition to the setting items, the setting values of which are stored in association with the shortcut key. In the present exemplary embodiment, the part of the setting items further includes the double-sided setting and the page aggregation setting that are set on the passport copy setting screen 210, and the sheet setting set on the output size setting screen 220, in addition to the reading size set using the shortcut key. Further, the part of the setting items further includes the setting items determined from the setting items that are set after the shortcut key is selected until the copy function selection screen 230 is displayed. For example, in the present exemplary embodiment, the part of the setting items includes the magnification determined from the output size and the page aggregation setting.

Next, the setting item to be reset when a tap operation is performed on "reset" 522 in the copy function is described with reference to FIGS. 5A and 5B. FIG. 5A illustrates a reset target item table 400 that indicates the setting items to be set to the respective default values when a tap operation is performed on "reset" 522 in the passport copy and a normal copy functions. The reset target item table 400 is stored in the NVRAM 130.

A column 401 indicates the setting items. A column 402 indicates whether the default value is set in each of the setting items when a tap operation is performed on "reset" 522 in the passport copy. A column 403 indicates whether the default value is set in each of the setting items when a tap operation is performed on "reset" 522 in the copy function.

A symbol "○" indicates that the setting item is a setting item to be reset. In contrast, a symbol "x" indicates that the setting item is a setting item not to be reset. For example, in the passport copy, "reading size", "page aggregation", "double-sided setting", "sheet size", and "magnification" are setting items not to be reset. That is, the above-described setting items are not set to the respective default values even when a tap operation is performed on "reset" 522. The above-described setting items are setting items, the respective setting values of which may be frequently changed by the user when the passport copy is performed, out of the setting items set in the copy function. On the other hand, the default values stored in the NVRAM 130 are set in the respective setting items of "density", "number of copies", and "other settings" in response to the tap operation on "reset" 522. In the copy function, all of the setting items of "reading size", "page aggregation", "double-sided setting", "sheet size", "magnification", "density", "number of copies", and "other settings" are setting items to be reset. In other words, when a tap operation is performed on "reset" 522, the CPU 103 reads the default values stored in the NVRAM 130 and sets the above-described setting items to the read default values. In the present exemplary embodiment, the reset target item table 400 stores whether each of the setting items is a setting item to be reset to the default value. The reset target item table 400 may store only items not to be reset to the respective default values.

The image forming apparatus 100, upon receipt of the reset instruction from the user, does not set the default values in the setting items not to be reset stored in the reset target item table illustrated in FIG. 5A and sets the default values in the other setting items. This makes it possible to prevent the default values from being set in the respective setting items associated with the shortcut key, in response to the reset instruction.

FIG. 5B illustrates a table that stores the default values in the copy function, and the setting items and the setting values that are stored in association with the shortcut key for the passport copy. The table illustrated in FIG. 5B is stored in the NVRAM 130. A column 450 indicates names of the functions and names of the shortcut keys. A column 451 indicates the setting items and the setting values of the respective setting items that are stored in association with the functions and the shortcut keys. As illustrated in FIG. 5B, as basic settings of the copy function, the magnification is set to "100%", the sheet size is set to "A4", the density is set to "±0", the number of copies is set to "one", the double-sided setting is set to "OFF", and the page aggregation setting is set to "OFF". Further, in the shortcut key for the passport copy, the reading size is set to the passport size.

Processing performed until the copy function setting screen 230 is displayed on the operation unit 121 in the present exemplary embodiment is described with reference to a flowchart of FIG. 6. A program to execute the processing illustrated in FIG. 6 is stored in the ROM 102, and the CPU 103 reads and executes the program stored in the ROM 102 to realize the processing.

In step S601, the CPU 103 displays the home screen 200 on the operation unit 121. Thereafter, in step S602, the CPU 103 determines whether "copy" 202 has been tapped. In a case where "copy" 202 has been tapped (Yes in step S602), the CPU 103 acquires, from the NVRAM 130, the default values of all of the setting items used in the copy function, and stores the default values in the RAM 104 in step S603. The CPU 103 then executes processing described in and after step S610. In a case where "copy" 202 has not been tapped (No in step S602), the processing proceeds to step S604.

In step S604, the CPU 103 determines whether "passport copy" 201 has been tapped. In a case where it is determined that "passport copy" 201 has not been tapped (No in step S604), the processing returns to step S602. In a case where it is determined that "passport copy" 201 has been tapped (Yes in step S604), the CPU 103 displays the passport copy setting screen 210 illustrated in FIG. 3A on the operation unit 121 in step S605.

Thereafter, in step S606, the CPU 103 determines whether a setting value has been selected. In a case where a setting value has not been selected from the combinations of the double-sided setting and the page aggregation setting displayed on the passport copy setting screen 210 (No in step S606), the CPU 103 continuously executes the processing in step S606. In a case where the setting value has been selected from the combinations of the double-sided setting and the page aggregation setting displayed on the passport copy setting screen 210 (Yes in step S606), the CPU displays the output size setting screen 220 on the operation unit 121 in step S607.

In step S608, the CPU 103 determines whether the output size has been selected on the output size setting screen 220. In a case where the output size has not been selected (No in step S608), the CPU 103 continuously executes the processing in step S608. In a case where the output size has been selected (Yes in step S608), the CPU 103 executes processing described in step S609.

In step S609, the CPU 103 stores, in the RAM 104, the setting values of the double-sided setting, the page aggregation setting, and the output size that are selected in steps S606 and S608, and "passport" size as the reading size. Thereafter, in step S610, the CPU 103 reads the setting values stored in the RAM 104 to generate the copy function setting screen 230, and displays, on the operation unit 121, the copy function setting screen 230 illustrated in FIG. 3C.

In step S611, the CPU 103 determines whether the reading size stored in the RAM 104 is equal to the reading size stored in association with the passport copy. For example, in a case where the passport copy is selected on the home screen 200, the reading size stored in the RAM 104 is the same as the reading size of the passport copy stored in the NVRAM 130. In contrast, in a case where the user taps "copy" 202 on the home screen 200 to display the copy function setting screen 230, the reading size is different from the reading size in the passport copy. In the present exemplary embodiment, in step S611, determination is performed based on whether the reading size stored in the RAM 104 is the same as the reading size stored in association with the shortcut key. In step S611, it may be determined whether all of the setting values of the job stored in the RAM 104 are the default values. At this time, when all of the setting values stored in the RAM 104 are the default values, the processing in the flowchart is ended. In contrast, in a case where the setting values of at least a part of the setting items are different from the default values, the CPU executes processing in step S612 and S613 described below because the setting values have been set with use of the shortcut key.

In a case where "passport" size is not set as the reading size (No in step S611), the processing in the flowchart is ended. In contrast, in a case where "passport" size is set as the reading size (Yes in step S611), the CPU 103 refers to the reset target item table 400 in the NVRAM 130, and stores the setting items not to be reset in the RAM 104 in step S612. Further, in step S612, the CPU 103 stores, in the RAM 104, the setting values of the setting items not to be reset stored in the RAM 104. In step S612, a region where the CPU 103 stores the setting values is different from a region where the CPU 103 stores the setting values in step S609, and is a region where the setting values read when "reset" 522 is tapped are stored. The setting items not to be reset stored in the RAM 104 in step S612 and the setting values stored in the RAM 104 in step S613 are deleted from the RAM 104 after the user finishes the use of the copy function.

Next, processing executed by the image forming apparatus 100 when the reset button is depressed is described with reference to a flowchart of FIG. 7. A program to execute the processing illustrated in FIG. 7 is stored in the ROM 102, and the CPU 103 executes the program stored in the ROM 102 to realize the processing.

In step S651, the CPU 103 determines whether "reset" 522 has been tapped. In a case where "reset" 522 has not been tapped (No in step S651), the processing in the flowchart is ended. In a case where "reset" 522 has been tapped (Yes in step S561), then in step S562, the CPU 103 determines whether the setting items not to be reset have been stored in the RAM 104. In a case where the setting items not to be reset have been stored in the RAM 104 (Yes in step S652), the CPU 103 acquires, from the RAM 104, the setting values of the setting items not to be reset in step S653. Further, the CPU 103 acquires, from the NVRAM 130, the setting values of the setting items to be reset in step S654.

In step S652, in a case where the setting items not to be reset have not been stored in the RAM 104 (No in step S652), the CPU 103 reads the default values of all of the setting items from the NVRAM 130 in step S655.

In step S656, the CPU 103 displays, on the operation unit 121, the copy function setting screen 230 on which the setting values acquired in step S653 and step S654 or the setting values acquired in step S655 have been set. Thereafter, the processing in the flowchart is ended.

In the first exemplary embodiment, the setting items to be reset to the respective default values and the setting items not to be reset to the respective default values are previously stored for each of the shortcut keys. Further, when the reset instruction to set the setting values of the setting items to the default values is received, the default values are set in the setting items to be reset without setting the default values in the setting items not to be reset. This makes it possible to prevent the default values from being set in the setting items associated with the shortcut key. Accordingly, it is possible to reduce a labor of a user, who has set setting values using a shortcut key, when setting again the setting values of the setting items associated with the shortcut key.

Further, in the first exemplary embodiment, the setting items set using the shortcut key and the setting values of the setting items set on the setting screen dedicated for the shortcut keys are stored. Further, the above-described stored setting values are set in the setting items not to be reset, in response to the reset instruction from the user. This allows the user to start the setting again from the copy function setting screen 230 displayed at the time when the user starts the setting using the shortcut key.

A second exemplary embodiment is described below. In the first exemplary embodiment, when the user sets the setting values of the setting items using the shortcut key, the setting items set using the shortcut key are excluded from the target items that are set to the default values based on the reset instruction by the user.

In the second exemplary embodiment, in a case where the user instructs resetting of the setting values without setting the setting values on the copy function setting screen 230, the user selects whether to set the default values in the setting items not to be reset. This makes it possible for the user to set the default values in the setting items to be reset on the copy function setting screen that is displayed after the shortcut key is tapped.

A system configuration of the image forming apparatus 100 according to the second exemplary embodiment is similar to the system configuration described in the first exemplary embodiment. Therefore, description of the system configuration is omitted. Further, operation of the image forming apparatus 100 when the user selects "copy" 202 or "passport copy" 201 on the home screen 200 is similar to the operation thereof described in the first exemplary embodiment. Therefore, description of the operation is omitted.

Transition of the screen displayed on the operation unit 121 in a case where the user taps "reset" 522 on the copy function setting screen 230 after "passport copy" 201 is selected according to the second exemplary embodiment is described with reference to FIGS. 8A to 8C.

FIG. 8A illustrates the copy function setting screen 230 on which the setting values that are set by the user on the passport copy setting screen 210 and the output size setting screen 220 are reflected. It is assumed that the user taps "reset" 522 without changing any of the setting values of the setting items on the screen.

A pop-up screen 1001 illustrated in FIG. 8B is then displayed on the operation unit 121. The pop-up screen 1001 is a screen for the user to select whether to set the default values in all of the setting items. In a case where the user taps "yes" 1002, the copy function setting screen 230 on which the default values have been set in all of the setting items is displayed on the operation unit 121 as illustrated in FIG. 8C. On the other hand, in a case where the user selects "no" 1003, the copy function setting screen 230, same as the screen in FIG. 8A, on which the default values have been set in the setting items to be reset is displayed on the operation unit 121, as in the first exemplary embodiment.

The processing executed when the user taps "copy" 202 or "passport copy" 201 in the second exemplary embodiment is similar to the processing in FIG. 6 according to the first exemplary embodiment. Therefore, description of the processing is omitted.

Processing performed when "reset" 522 is tapped in the second exemplary embodiment is described with reference to a flowchart of FIG. 9. A program to execute the processing illustrated in FIG. 9 is stored in the ROM 102, and the CPU 103 reads and executes the program stored in the ROM 102 to realize the processing illustrated in FIG. 9. The processing in steps S651 to S656 is similar to the processing in steps S651 to S656 described in the first exemplary embodiment. Therefore, description of the processing is omitted.

In step S652, in a case where the setting items not to be reset are stored in the RAM 104 (Yes in step S652), the CPU 103 executes the processing in steps S653 and S654. Then in step S901, the CPU 103 determines whether the setting values acquired from the RAM 104 in step S653 are the same as the setting values currently displayed on the copy function setting screen 230 displayed on the operation unit 121. In a case where the setting values acquired from the RAM 104 are different from the current setting values (No in step S901), the processing proceeds to step S656. On the other hand, in a case where the setting values acquired from the RAM 104 are the same as the currently-set setting values (Yes in step S901), in step S902, the CPU 103 displays, on the operation unit 121, the pop-up screen 1001 allowing the user to select whether to set the default values in all of the setting items. In step S903, the CPU 103 determines whether "yes" 1002 has been tapped.

In a case where tap operation of "yes" 1002 has been received from the user (Yes in step S903), the CPU 103 executes the processing in step S655.

In a case where tap operation of "yes" 1002 has not been received (No in step S903), the CPU 103 determines, in step S904, whether "no" 1003 has been tapped. In a case where tap operation of "no" 1003 has been received from the user (Yes in step S904), the CPU 103 executes the processing in step S656. In a case where it is not determined in step S904 that "no" 1003 has been tapped (No in step S904), the processing returns to step S903.

In the second exemplary embodiment, it is compared whether the setting values to be displayed when the user taps "reset" 522 are the same as the setting values stored in the RAM 104. In a case where "reset" 522 is tapped despite that the setting values of the predetermined setting items associated with the used shortcut key are not changed, the user selects whether to set the default values in all of the setting items. In such a manner, it is possible for the user to set the default values in all of the setting items including the setting items not to be reset even in a case where the user starts setting of the copy function using the shortcut key.

Other Exemplary Embodiments

In the first and second exemplary embodiments, the CPU 103 acquires whether the reading size is set to the passport size and determines whether to store, in the RAM 104, the setting items not to be reset stored in the ROM 102. Alternatively, a flag indicating whether the shortcut key such as "passport copy" 201 has been used may be stored in the RAM 104. A default value of the flag is set to OFF, and after tap operation of "passport copy" is received in step S604 of FIG. 6, the CPU 103 sets the flag stored in the RAM 104 to ON. In step S611, the CPU 103 refers to the flag stored in the RAM 104 and may execute the processing in and after step S612 when the flag is ON. When the flag is OFF, the processing in the flowchart may be ended.

Further, in the first and second exemplary embodiments, the shortcut key in which "passport" is set as the reading size has been described. The first and second exemplary embodiments may be applied to a shortcut key other than the passport copy. For example, a shortcut key of "ID card copy" in which both sides of ID card are printed on one sheet may be prepared in advance, and the magnification and the page aggregation setting may be handled as the setting items not to be reset. Further, the setting items and the setting values registered as the shortcut key may be settable by the user. At this time, the setting items, the setting values of which have been changed from the default values, are handled as the setting items that are not to be reset to the default values. On the other hand, the setting items, the setting values of which are set to the values same as the default values, are handled as the setting items to be reset to the default values. For example, it is assumed that the user sets "2 in 1, single-sided to double-sided" and registers the setting in a shortcut key. At this time, the image forming apparatus 100 stores, in the reset target item table stored in the NVRAM 130, the page aggregation setting and the double-sided setting as the setting items that are not to be reset to the default values. Further, the CPU 103 stores "page aggregation setting=2 in 1, and double-sided setting=double-sided to double-sided" in the table illustrated in FIG. 5B.

In the first and second exemplary embodiments, the setting values of the setting items not to be reset are set to the setting values stored in the RAM 104 in step S609 of FIG. 6 in response to a tap operation on "reset" 522. Alternatively, the setting values of the setting items to be reset may be set to the default values and the setting values of the setting items not to be reset may not be changed in response to a tap operation on "reset" 522.

According to embodiments of the present invention, when setting values are set in setting items using a shortcut key and default values are then set in the setting items in response to a reset instruction, it is possible to reduce labor to set again the setting values of a part of the setting items.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Btu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-203959, filed Oct. 20, 2017, which is hereby incorporated by reference herein in its entirety.

What is claimed is:

1. A job execution apparatus, comprising:
a storage configured to store a first setting value as a setting value of one setting item about a predetermined function and store a second setting value as a setting value of the one setting item about the predetermined function;
a display configured to, based on a selection of a first button associated with the first setting value, display a setting screen of the predetermined function on which the first setting value is set for the one setting item, and configured to, based on a selection of a second button associated with the second setting value, display the setting screen of the predetermined function on which the second setting value is set for the one setting item; and
one or more processors configured to perform processing, including
receiving a change in a setting value of a setting item about the predetermined function from a user via the setting screen,
executing a job of the predetermined function with use of the setting values set via the setting screen,
causing the display to display the setting screen on which the first setting value is set for the one setting item based on a reset instruction given for resetting the setting values by the user in a case where the setting screen is displayed by selection of the first button, and
causing the display to display the setting screen on which the second setting value is set for the one setting item based on the reset instruction given by the user in a case where the setting screen is displayed by selection of the second button.

2. The job execution apparatus according to claim 1, wherein the storage stores a default value of other setting item that is different from the one setting item, and
wherein the one or more processors cause the display to display the setting screen on which a setting value that is different from the default value and is set by the user is set for the other setting item even if the reset instruction is given by the user in a case where the setting screen is displayed by selection of the second button.

3. The job execution apparatus according to claim 1, wherein the storage stores a setting value for each of a plurality of setting items about the predetermined function, and
wherein the plurality of setting items includes the one setting item.

4. The job execution apparatus according to claim 2, wherein, in a case where the second button is selected, the one or more processors cause the display to display a screen for setting the other setting item,
wherein a value set via the screen for setting the other setting item is stored, and
wherein, based on the reset instruction, the one or more processors cause the display to display the setting screen on which the value set via the screen for setting the other setting item is set.

5. The job execution apparatus according to claim 3, wherein the display displays a function selection screen, wherein the function selection screen includes the first button and the second button, and displays the setting screen, according to selection of the second button on the function selection screen, wherein the setting screen enables other setting item that is different from the one setting item to be set.

6. The job execution apparatus according to claim 5, wherein the storage stores setting values set on the screen for setting the other setting item.

7. The job execution apparatus according to claim 6, wherein, upon receipt of the reset instruction while the setting screen displayed in response to the selection of the second button is being displayed, the one or more processors set setting values stored in the storage in the other setting item.

8. The job execution apparatus according to claim 2, wherein the one or more processors further perform processing, including
determining whether the setting values set in the one setting item and in the other setting item are the same as the setting values stored in the storage, upon receipt of the reset instruction while the setting screen displayed in response to the selection of the second button is being displayed, and
wherein the one or more processors cause the display to display the setting screen on which the first setting value is set for the one setting item.

9. The job execution apparatus according to claim 8, wherein, in a case where the one or more processors determine that the setting values set in the one setting item and in the other setting item are the same as the setting values stored in the storage, the one or more processors cause the display to display a screen on which default values are set for both of the setting items.

10. The job execution apparatus according to claim 1, wherein the one setting item is any one of page aggregation, double-sided setting, a magnification, and a sheet size.

11. The job execution apparatus according to claim 1, further comprising:
a reader configured to read an image of a document to generate image data; and
a printer configured to print an image generated from the image data on a sheet,
wherein the one or more processors execute the job with use of at least one of the reader and the printer.

12. The job execution apparatus according to claim 11, wherein the one setting item is a setting item for setting a reading size of the image of the document to be read by the reader.

13. The job execution apparatus according to claim 12, wherein a setting value of the setting item for setting the reading size of the image of the document to be read by the reader is different from a regular sheet size used in printing of the image.

14. The job execution apparatus according to claim 1, wherein the storage stores a table indicating whether each of a plurality of setting items is a setting item to be set to a default value according to the reset instruction.

15. The job execution apparatus according to claim 1, wherein the second button is a shortcut key for aggregating and printing, on one sheet, images that are obtained by reading a plurality of sheets of a predetermined size.

16. The job execution apparatus according to claim 1, wherein the storage stores a third value as a setting value of other setting item that is a setting item about the predetermined function and is different from the one setting item,
wherein the one or more processors cause the display to display the setting screen on which the first setting value is set for the one setting item and the third setting value is set for the other setting item based on the reset instruction given by the user in a case where the setting screen is displayed by selection of the first button, and cause the display to display the setting screen on which the second setting value is set for the one setting item and the third setting value is set for the other setting item based on the reset instruction given by the user in a case where the setting screen is displayed by selection of the second button.

17. The job execution apparatus according to claim 1, wherein the predetermined function is a copy function.

18. A method of controlling a job execution apparatus, the method comprising:
storing a first setting value as a setting value of one setting item about a predetermined function and store a second setting value as a setting value of the one setting item about the predetermined function;
displaying, on a display, based on a selection of a first button associated with the first setting value, a setting screen on which the first setting value is set for the one setting item;
displaying, on the display, based on a selection of a second button associated with the second setting value, the setting screen on which the second setting value is set for the one setting item;
receiving a change in a setting value of a setting item about the predetermined function from a user via the setting screen;
executing a job of the predetermined function with use of the setting values set via the setting screen displayed on the display;
displaying, on the display, the setting screen on which the first setting value is set for the one setting item based on a reset instruction given for resetting the setting values by the user in a case where the setting screen is displayed by selection of the first button; and
displaying, on the display, the setting screen on which the second setting value is set for the one setting item based on the reset instruction given by the user in a case where the setting screen is displayed by selection of the second button.

19. The method of controlling the job execution apparatus according to claim 18,
wherein the setting screen on which the first setting value is set for the one setting item and a third setting value is set for other setting item is displayed on the display based on the reset instruction given by the user in a case where the setting screen is displayed by selection of the first button, and
wherein the setting screen on which the second setting value is set for the one setting item and the third setting value is set for the other setting item is displayed on the display based on the reset instruction given by the user in a case where the setting screen is displayed by selection of the second button.

20. A non-transitory computer readable storage medium storing a program for causing a computer to perform a control method, the control method comprising the steps of:
storing a first setting value as a setting value of one setting item about a predetermined function and store a second setting value as a setting value of the one setting item about the predetermined function;

displaying, on a display, based on a selection of a first button associated with the first setting value, a setting screen on which the first setting value is set for the one setting item;

displaying, on the display, based on a selection of a second button associated with the second setting value, the setting screen on which the second setting value is set for the one setting item;

receiving a change in a setting value of a setting item about the predetermined function from a user via the setting screen;

executing a job of the predetermined function with use of the setting values set via the setting screen displayed on the display;

displaying, on the display, the setting screen on which the first setting value is set for the one setting item based on a reset instruction given for resetting the setting values by the user in a case where the setting screen is displayed by selection of the first button; and displaying, on the display, the setting screen on which the second setting value is set for the one setting item based on the reset instruction given by the user in a case where the setting screen is displayed by selection of the second button.

* * * * *